(12) United States Patent
Wiegand

(10) Patent No.: US 6,314,816 B1
(45) Date of Patent: Nov. 13, 2001

(54) MEASUREMENT SYSTEM FOR A PRESSURE MEASUREMENT DEVICE AS WELL AS A PRESSURE MEASUREMENT DEVICE

(75) Inventor: Alexander Wiegand, Erienbach (DE)

(73) Assignee: WIKA Alexander Wiegand GmbH & Co., Klingenberg/Main (DE)

( * ) Notice: Subject to any disclaimer, the term of this patent is extended or adjusted under 35 U.S.C. 154(b) by 0 days.

(21) Appl. No.: 09/460,469

(22) Filed: Dec. 14, 1999

(30) Foreign Application Priority Data

Dec. 15, 1998 (EP) ................................. 98 123 831

(51) Int. Cl.[7] ........................................... G01L 7/04
(52) U.S. Cl. ................................. 73/742; 73/732
(58) Field of Search .................... 73/742, 732, 756, 73/740, 115, 736, 741, 743

(56) References Cited

U.S. PATENT DOCUMENTS

| | | |
|---|---|---|
| 3,921,455 | 11/1975 | Staubli et al. . |
| 4,192,193 | 3/1980 | Schnell . |
| 4,245,497 * | 1/1981 | Reissmiller ............................ 73/115 |
| 4,413,529 * | 11/1983 | Bissell ................................... 73/756 |
| 5,481,921 | 1/1996 | Carpenter et al. . |

FOREIGN PATENT DOCUMENTS

3508246C1    6/1986   (DE) .

* cited by examiner

Primary Examiner—William Oen
Assistant Examiner—Abdullahi Aw-Musse
(74) Attorney, Agent, or Firm—Roth & Goldman

(57) ABSTRACT

The pressure measurement device has a housing (2) with a back wall (8) and a side wall (10), a measurement system arranged inside the housing as well as a connection arrangement (6) with a device connector (64) arranged outside on the housing. The measurement system has a pointer mechanism (14) with an upper plate (20) and a pointer shaft (30) as well as a curved, metal Bourdon tube (12) and a spring support (16) supporting the Bourdon tube. The connection arrangement (6) and the spring support (16) are connected inside the housing by means of a plug connection which is formed by a first plug-in component (52) designed on the spring support and a second plug-in component designed on the connection arrangement (6). The measurement system is distinguished by the fact that its spring support (16) has the plug-in component (52) and that the plug-in component is arranged radially near the pointer shaft (30).

19 Claims, 3 Drawing Sheets

Figure 1:
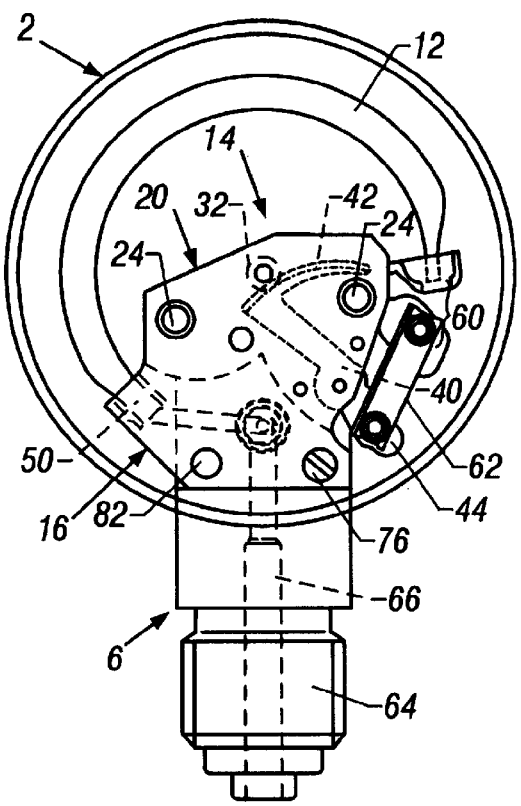

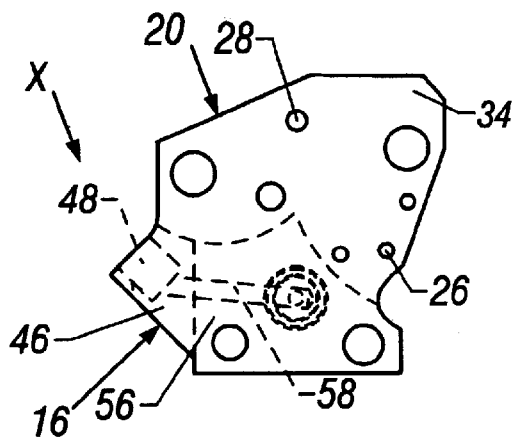
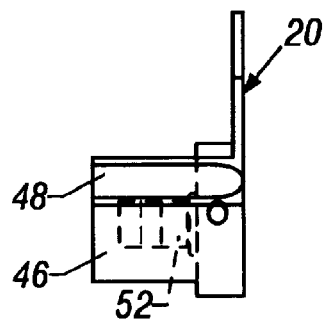
FIG. 5  FIG. 6
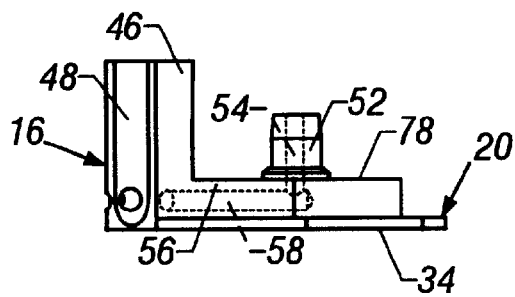
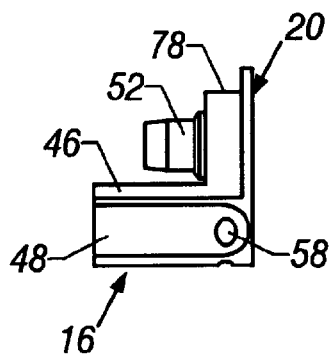
FIG. 7  FIG. 8
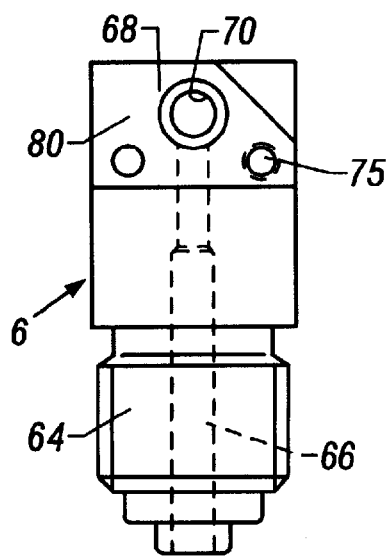
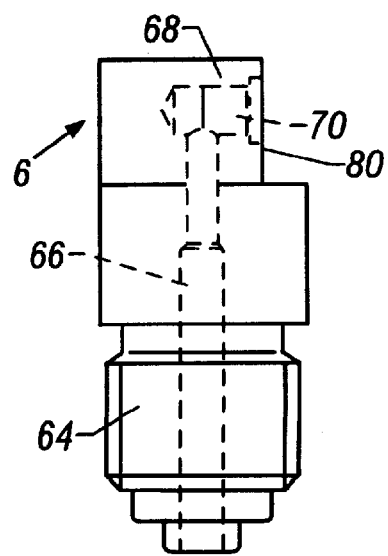
FIG. 9  FIG. 10

MEASUREMENT SYSTEM FOR A PRESSURE MEASUREMENT DEVICE AS WELL AS A PRESSURE MEASUREMENT DEVICE

The invention concerns a measurement system for a pressure measurement device.

In the known measurement system and the known pressure measurement device, the spring support is designed in one piece. The connection part of the spring support is usually designed as a threaded pin with an outside thread, whereby it is, however, also possible to design the connection part as a threaded sleeve with an inside thread. When the measurement system is incorporated into the housing of the pressure measurement device, the connection part is on the outside of the housing and it forms the device connection of the connection arrangement for connection of the pressure measurement device to a system carrying a fluid substance to be measured. The device connection may be screwed into a threaded bore or onto a threaded pin provided with an outside thread of the system carrying the measurement substance. The connection arrangement has a pressure channel by means of which the measurement pressure is forwarded to the Bourdon tube of the measurement system. In the known pressure measurement device, this connection arrangement, to which the device connection and the pressure channel belong, is integrated into the Bourdon tube and pointer shaft support.

The known pressure measurement device is provided either with a so-called radial fluid connector or with a so-called rear connection. In the case of rear connection, the fluid connector is located on the back wall of the housing of the pressure measurement device, whereby it, when designed as a threaded pin, protrudes from the back wall of the housing. In the case of radial connection, the fluid connector is located on the side wall of the housing, whereby it, when designed as a threaded pin, protrudes from the side wall of the housing. Since, in the known measurement system, the connection arrangement is integrated into the support and its connection part forms the device connection, the connection part for a pressure measurement device with radial connection must be arranged on the support, i.e., must extend in the radial direction relative to the pointer shaft, whereas for a pressure measurement device with rear connection, the fluid connector must extend toward the rear in the axial direction of the pointer shaft. This means that a fully assembled measurement system is suitable only for a pressure measurement device with radial connection or for a pressure measurement device with rear connection.

This creates the problem for the manufacturer of pressure measurement devices that he must keep in inventory both measurement systems with a radial connection part and measurement systems with a rear connection part for each measurement range if he wants to be capable of quickly delivering otherwise identical pressure measurement devices according to customer demand either with radial connection or with rear connection. It is possible to partially avoid this high production and storage expenditure in that units comprising only the support and the Bourdon tube both with a radial connection part and with a rear connection part are produced and kept in stock and that the assembly of these units with the pointer mechanism into the measurement system does not occur until it is specified, based on a customer order, whether the pressure measurement devices to be delivered are to have radial or rear connection. However, with this procedure, quick delivery of the pressure measurement devices is not possible since the usually necessary and time-consuming adjustment of the measurement system can be performed only on the fully assembled measurement system or during assembly of the measurement system at the earliest.

The publication FR-A1-25 32 423 discloses a pressure measurement device which claims to solve the above-described problem. In this prior art pressure measurement device, a rear threaded hole and a radial threaded hole, both of which are connected with the pressure channel designed in the spring support, are designed in the spring support. As needed, a device connector produced as a separate part is screwed either into the rear or into the radial threaded bore, and the other threaded bore is sealed in each case by a screw plug. This solution has the disadvantage that the production of the spring support is comparatively complex and that it is necessary to seal the pressure channel reliably against the outside at two locations, i.e., both at the radial threaded bore and at the rear threaded bore.

The publication DE-C2-19 530 024 discloses a pressure measurement device whereby the device connection is designed as an insertion pin arranged on the rear.

The object of the invention is to improve the generic pressure measurement system such that the type and the site of the device connection of a pressure measurement device into which the measurement system can be incorporated is not already predetermined by the design of the measurement system. In particular, the measurement system to be created should be suitable both for a pressure measurement device with radial connection and for a pressure measurement device with rear connection. Moreover, the measurement system to be created should be as compact as possible and have no greater space requirement than the generic measurement system.

A further object of the invention is to improve the generic pressure measurement system such that the site and type of its device connection may be freely selected without this requiring a different measurement system depending on the type and site of the device connection.

A measurement system wherein the connection part is designed as a plug-in component, belongs to the prior art on the basis of the older, but unpublished European Patent Application No. 98 113 938.9. However, in this measurement system belonging to the prior art, the plug-in component is not arranged radially near the pointer shaft.

The measurement system according to invention is connected directly or indirectly with the system carrying the substance to be measured, whose pressure is to be measured, in that the plug-in component of the measurement system is plugged in along with a second plug-in component shaped to complement the plug-in component of measurement system. The second plug-in component may, for example, be part of a connection arrangement of a pressure measurement device provided with a device connection, whereby the plug-in connector of the measurement system does not then also form the device connection. The type and the site of the device connection on the pressure measurement device are thus not predetermined by the measurement system. Instead, the measurement system according to the invention is suitable both for a pressure measurement device with radial connection and for a pressure measurement device with rear connection. The same measurement system can, consequently, be used both for the production of a pressure measurement device with radial connection and for the production of a pressure measurement device with rear connection. In order to be able to quickly deliver a specific number of pressure measurement devices which have, per customer demand, either radial connection or rear connection, it suffices to produce fully assembled and adjusted measurement systems for the measurement range in this number and to keep them in inventory. Only the connection arrangements with radial device connection and the connection arrangements with rear device connection have to be kept in stock in each case in the specific number. The final assembly of the pressure measurement devices can take place in a short time since the time-consuming adjustment of the measurement systems can already be performed before assembly thereof with the connection arrangement.

Because of the fact that, in the measurement system according to the invention, the plug-in component is placed behind a plane including the back of the upper plate and radially near the pointer shaft, it is located inside a space which must be provided anyway for the pointer mechanism, the Bourdon tube, and the Bourdon tube mount of the support, such that the space requirement of the measurement system is not increased due to the fact that the plug-in component is present in the measurement system according to the invention. When the measurement system according to invention is incorporated into the housing of a pressure measurement device, it, consequently, requires no larger housing than the generic measurement system.

The design provided according to the invention of the connection part as a plug-in component also results in the fact that assembly with the second, complementary plug-in component requires only a translational motion and no rotary motion. This proves to be particularly advantageous when the measurement system is used in the interior of a housing or another chamber and no adequate space is available inside the housing or the chamber to be able to rotate the measurement system 360° several times, as would be the case, for example, if the connection part were provided with a thread.

The measurement system according to invention was, to be sure, created primarily for a pressure measurement device with a housing and a device connection arranged on the outside of the housing. However, it is usable not only with such a pressure measurement device but also with a pressure measurement device without an external device connection. For example, the second, complementary plug-in component can be designed directly on the system carrying the substance to be measured and the plug-in component of the support of the measurement system can be integrated with this second plug-in component.

Provision can be made in an advantageous embodiment of the invention for the Bourdon tube mount, the spring support and the plug-in component of the support, including the upper plate to be designed in one piece. This design has, in particular, the advantage that it is not necessary to mount the upper plate on the spring support and that the mount of the spring support and the upper plate assume precisely their proper position relative to each other.

Moreover, provision can be made in an advantageous embodiment of the invention for the axis of the plug-in component to run parallel to the pointer shaft and for the opening of the bore for the plug-in component to be arranged on its end turned away from the upper plate. This makes it possible to connect the plug-in component on the support and the second, complementary plug-in component with one straight line motion in the direction of the axis of the pointer shaft, a situation which facilitates installation of the measurement system into a front-opened housing of a pressure measurement device.

The older, unpublished European Patent Application No. 98 113 938.9 discloses a pressure measurement device which differs from the pressure measurement device disclosed herein in that the plug-in component disclosed herein is arranged radially near the pointer shaft.

In the pressure measurement device according to the invention, the plug-in component of the spring support of the measurement system, which is referred to the following as the first plug-in component, and the plug-in component of the connection arrangement mate, such that these two plug-in components form a plug connection. This plug connection is located protected inside the housing of the pressure measurement device.

With regard to the properties of the pressure measurement device according to invention and the effects obtained by its design according to the invention, the preceding explanations of the measurement system according to the invention apply to the extent that these explanations refer to the measurement system according to the invention as part of a pressure measurement device with a housing and of a connection arrangement which has a device connection.

In the pressure measurement device according to invention, the connection arrangement on the one hand and the spring support on the other are two separately produced devices which are connected to each other by means of the plug connection formed by the two plug-in components. This makes it possible to manufacture the spring support on one hand and the connection arrangement on the other from different materials such that the connection arrangement does not necessarily have to be made of metal, but may, for example, be made of a plastic. This possibility does not exist in the prior art measurement system discussed in the introduction wherein the connection arrangement is integrated into the spring support and, thus, is, of necessity, made of the metal material of the spring support.

Figure 2:
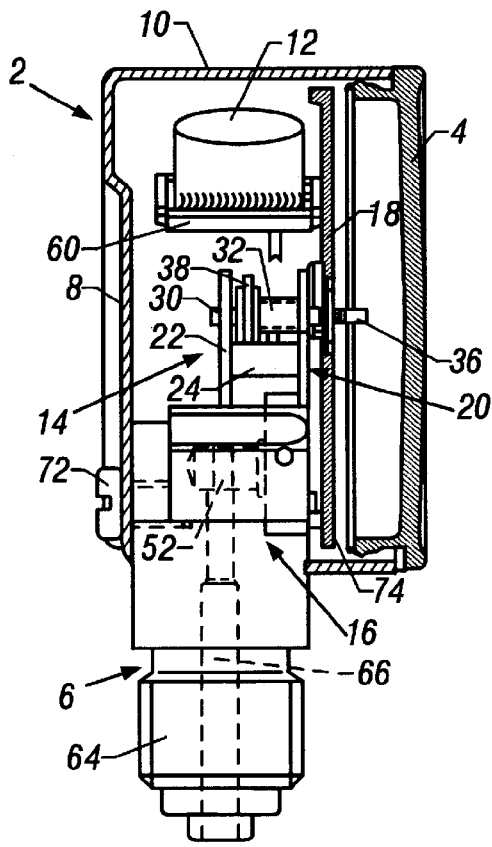
Figure 3:
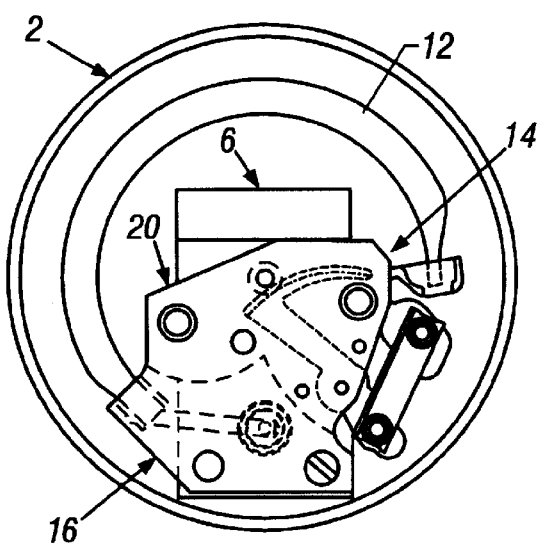
Figure 4:
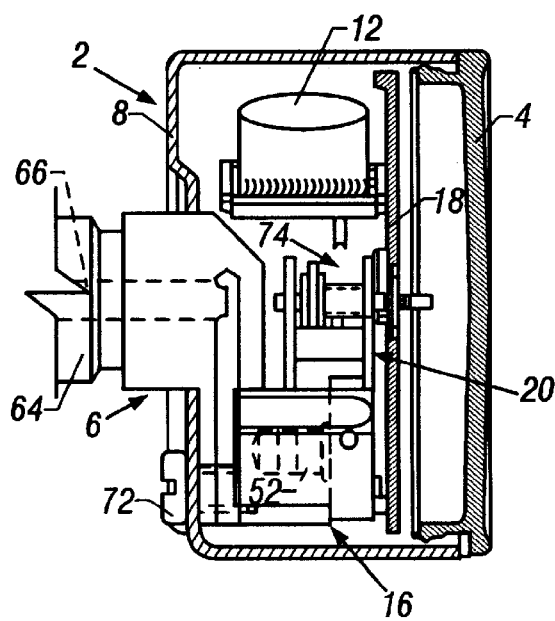
Figure 11:
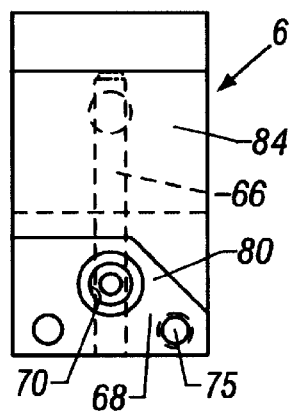
Figure 12:
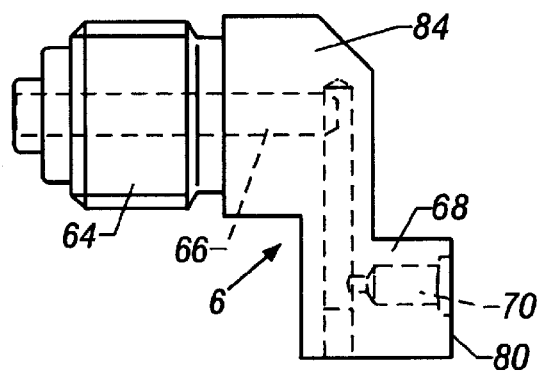
Figure 13:
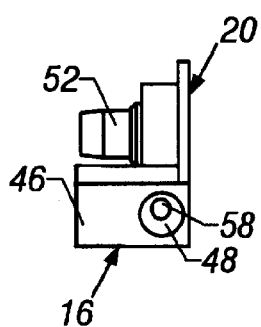
Figure 14:
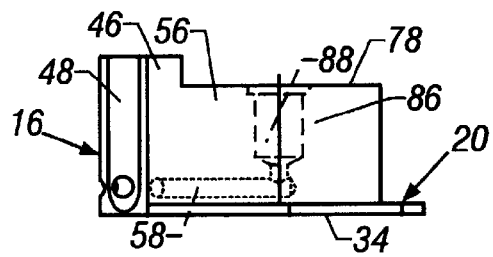
Figure 17:
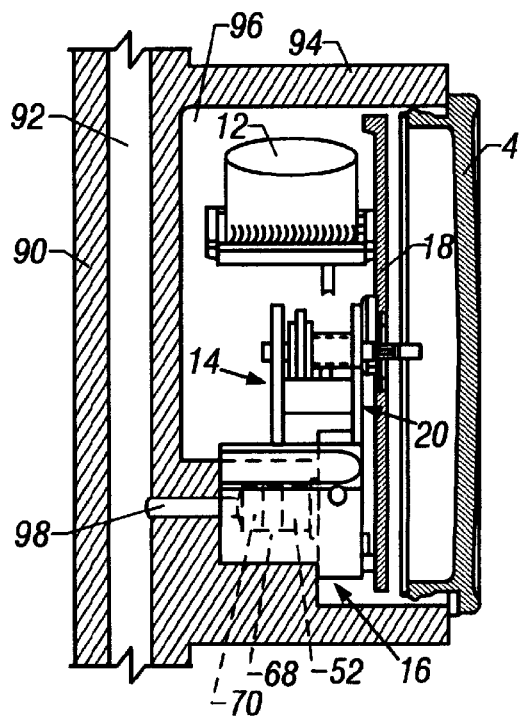
Figure 15:
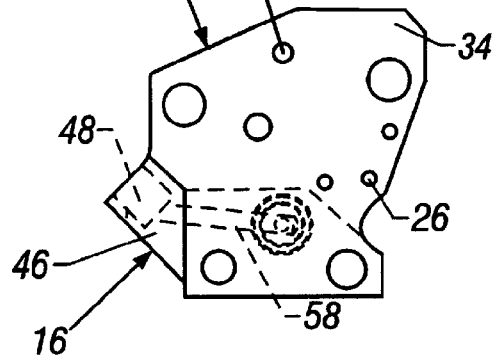
Figure 16:
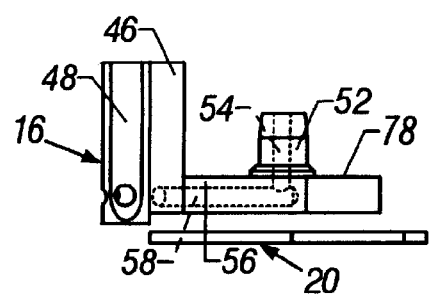

Exemplary embodiments of the invention are depicted in the drawings and are explained in the following. They depict:

FIG. 1 a front view of the first exemplary embodiment of the pressure measurement device according to the invention, whereby its viewing window, pointer, and dial face are omitted;

FIG. 2 a view of the pressure measurement device from the left in FIG. 1, whereby its housing, dial face, and viewing window are depicted in cross-section;

FIG. 3 a front view corresponding to FIG. 1 of a second exemplary embodiment of the pressure measurement device according to the invention;

FIG. 4 a view corresponding to FIG. 2 of the second exemplary embodiment of pressure measurement device;

FIG. 5 a front view of a system support of the pressure measurement device according to FIGS. 1 and 2;

FIG. 6 a side view of the system support from the left in FIG. 5;

FIG. 7 a top view of the system support according to FIG. 5;

FIG. 8 a view of the system support in the direction X in FIG. 5;

FIG. 9 a front view of a connection arrangement of the pressure measurement device according to FIGS. 1 and 2;

FIG. 10 a side view of the connection arrangement from the left in FIG. 9;

FIG. 11 a front view of a connection arrangement of the pressure measurement device according to FIGS. 3 and 4;

FIG. 12 a side view of the connection arrangement from the left in FIG. 11;

FIG. 13 a view corresponding to FIG. 8 of a second embodiment of the system support;

FIG. 14 a top view corresponding to FIG. 7 of a third embodiment of the system support;

FIG. 15 a front view of a unit comprising a spring support and an upper plate;

FIG. 16 a top view of FIG. 15, whereby the spring support and the upper plate are depicted before assembly with a distance between them; and FIG. 17 a third exemplary embodiment of the pressure measurement device according to the invention depicted analogously to FIG. 2.

In the following, a first exemplary embodiment of the pressure measurement device according to the invention, which is provided with a measurement system according to the invention, is explained first with reference to FIGS. 1, 2, and 5 through 10.

The pressure measurement device includes a housing 2, a transparent viewing window 4, a measurement system arranged inside the housing 2, and a connection arrangement 6.

The housing 2 of the exemplary embodiment depicted is made of sheet metal and has a substantially flat back wall 8 as well as a cylindrical side wall 10. A transparent viewing window 4 is set in the open front of the housing 2. The measurement system includes a metal Bourdon tube 12, which is curved into a circular arc in the embodiment depicted, a pointer mechanism 14, a spring support 16, as well as a dial 18. In FIG. 2, only the free end of the Bourdon tube 12 is depicted.

The pointer mechanism 14 includes a substantially flat upper plate 20 and a lower plate 22 arranged at a distance from the upper plate 20 and parallel thereto. The two plates 20 and 22 are solidly connected to each other by means of two spacer bolts 24. Two bearing holes 26 and 28 are formed in the upper plate 20 (see FIG. 5). Corresponding bearing holes are also formed in the lower plate 22. A pointer shaft 30 which supports a pinion which is arranged between the upper plate 20 and the lower plate 22 is rotatably mounted in the bearing hole 28 as well as in the corresponding bearing hole in the lower plate 22. The surface of the upper plate 20 turned away from the lower plate 22 is its front 34. A section of the pointer shaft 30 which forms a pointer pin 36 protrudes from the front 34 which is turned toward the viewing window 34. A spiral-shaped tension spring 38 depicted only in FIG. 2 engages the pointer shaft 30.

A toothed segment 40, which has a toothed section 42 mating with the pinion 32 and a lever section 44, is pivotably mounted in the bearing hole 26 and the corresponding bearing hole in the lower plate 22.

The spring support 16 includes a mount 46 with a recess 48 forming a groove, in which a first end 50 of the Bourdon tube 12 is set. The first end 50 is solidly connected with the mount 46. This solid connection is usually made by soldering.

The spring support 16 also includes a first plug-in component designed as an insertion pin 52. The insertion pin 52 has on its free top end in FIG. 7 a truncated-cone-shaped surface and connected thereto a circular-cylindrical surface, as is discernible in particular in FIGS. 7 and 8. On its lower end in FIG. 7, the insertion pin 52 is provided with an annular collar. Along the axis of the insertion pin 52, a bore 54, which has an opening on the free top end of the insertion pin 52 in FIG. 7, runs through it.

The spring support 16 also has a connection part 56, in which a connecting channel 58 is formed, which connects the bore 54 in the insertion pin 52 with the recess 48 of the mount 46 such that pressure to be measured can be forwarded through the spring support 16 from the bore 54 into the interior of the Bourdon tube 12.

As is discernible in FIG. 1, the spring support 16 holds the Bourdon tube 12 such that this surrounds the pointer mechanism 14 in an arc shape. On the other, second end of the Bourdon tube 12, this is tightly sealed and has a tube end piece 60. The tube end piece 60 is connected hinge-like by means of a pull bar 62 with the lever section 44 of the toothed segment 40 such that the deflection of the free, second end of the Bourdon tube 12 occurring as a function of the magnitude of the pressure to be measured is transferred by means of the pull bar 62 to the toothed segment 40. Thus, the toothed segment 40 is pivoted as a function of the magnitude of the pressure to be measured, and this pivot motion is converted because of the mating of the toothed section 42 and the pinion 32 into a rotation of the pointer shaft 30.

The dial 18 is arranged near the front 34 of the upper plate 20 and fastened to the upper plate 20. The pointer pin 36 extends through the dial 18 and carries a pointer not depicted in FIGS. 1 and 2, whose position in front of the dial 18 is determined by the rotational position of the pointer shaft 30 and thus corresponds to the pressure to be measured such that the magnitude of the pressure to be measured can be read out through the viewing window 4 on the dial 18 according to the pointer position.

The connection arrangement 6 is, in the exemplary embodiment depicted, designed as a one-piece component which is depicted separately in FIGS. 9 and 10. The connection arrangement 6 has substantially the shape of a right parallelepiped on which a fluid connector 64, which is designed as a threaded pin with an outside thread. On the end of the connection arrangement 6 facing away from the radial connector 64, the connection arrangement has a second plug-in component designed as a sleeve 68 with a bore 70. The plug sleeve 68 is shaped complementary to the insertion pin 52 of the spring support 16. In other words, the bore 70 has a diameter corresponding to the diameter of the insertion pin 52 as well as a depth which is greater than the length of the insertion pin 52 in its axial direction such that the insertion pin 52 can be inserted into the sleeve 68. A pressure channel 66, which runs from the free end of the radial connector 64 to the bore 70 of the sleeve 68, is formed in the connection arrangement 6.

In the side wall 10 of the housing 2, an opening is formed, into which the connection arrangement 6 is inserted such that the sleeve 68 is located inside the housing 2 and that the fluid connector 64 protrudes radially outward from the housing 2 (relative to the cylindrical side wall 10 and also relative to the axis of the pointer shaft 30). The pressure measurement device according to FIGS. 1 and 2 is thus a pressure measurement device with radial connection. The fluid connector 64 connects the pressure measurement device to a system which carries the substance to be measured.

The connection arrangement 6 is attached to the housing by means of a screw 72 screwed through its back wall 8 into the connection arrangement 6. The insertion pin 52 of the spring support 16 of the measurement system is inserted into the sleeve 68 of the connection arrangement 6, as is discernible in FIG. 2. The insertion pin 52 and the sleeve 68 thus form a pressure conducting plug connection between the connection arrangement 6 and the spring support 16. The pressure measured can reach the Bourdon tube 12 through the pressure channel 66, the bore 70 of the sleeve 68, the bore 54 in the insertion pin 52, and the connection channel 58.

Following the production of the above-described pressure measurement device, the above-described measurement system is produced by assembling the Bourdon tube 12, the pointer mechanism 14, the spring support 16, and possibly the dial 18. To the extent required, this measurement system is then adjusted such that a fully assembled and adjusted measurement system is available. This measurement system can be plugged together and connected with the connection arrangement 6 before the connection arrangement 6 is incorporated into the housing 2. Alternatively, the connection arrangement 6 can be incorporated into the housing 2 and attached thereto, after which the measurement system is inserted into the housing 2 and the plug connection between the connection arrangement 6 and the measurement system is made. After the measurement system has been connected with the connection arrangement 6 and the connection arrangement 6 has been connected with the housing 2, the pointer (not shown) is set on the pointer pin 36 and the viewing window 4 is inserted in the housing 2.

The design and form of the spring support 16 and the upper plate 20 are depicted in FIGS. 5 through 8. In the exemplary embodiment depicted in these figures, the mount 46, the connection part 56, the insertion pin 52, and also the upper plate 20 are designed in one piece such that these elements together form a system support, which fulfills the functions of the spring support for the Bourdon tube 12 and of the upper plate of the pointer mechanism 14 and also forwards the pressure to be measured to the Bourdon tube 12. As FIGS. 6 through 8 in particular show, both the mount 46 and the connection part 56 and the insertion pin 52 are placed on the same side of the upper plate 20. These elements are located behind a plane containing the front 34 of the upper plate 20 and extend to the side of the upper plate 20 on which the pinion 32 is arranged. The axis of the insertion pin 52 runs parallel to the pointer shaft 32, and the opening of the bore 54 in the insertion pin 52 is located on the end of the insertion pin 52 facing away from the upper plate 20. The mount 46 and its recess 48 designed as a groove run substantially parallel to the insertion pin 52 and thus parallel to the pointer shaft 30. The connection channel 58 runs substantially parallel to the plane of the back of the upper plate 20 The thickness of the connection part 56 measured in the direction of the axis of the insertion pin 52 is low and substantially determined by the fact that the wall thickness of the connection channel 58 must be adequate.

As seen from the depiction in FIGS. 2 and 5 through 8, the insertion pin 52 is arranged on the spring support 16 and designed such that it is located radially near the pointer shaft 30. As is discernible in FIG. 2, the insertion pin 52 is further arranged such that its distance from the pointer shaft 30 is less than the distance of the edge section 74 of the dial 18 nearest the insertion pin 52 from the pointer shaft 30. This ensures that the insertion pin 52 is located inside a space which is necessary anyway as installation space for the measurement system such that the installation space necessary for the measurement system is not enlarged although the measurement system has the insertion pin 52 additionally provided inside the housing 2.

The design of the insertion pin 52 such that its axis runs parallel to the pointer shaft 30 and that it protrudes toward the back from the plane containing the back of the upper plate 20 brings with it the advantage that the measurement system can be installed from the front into the housing 2 and along with the connection arrangement 6 after the connection arrangement 6 has been attached to the housing 2.

The connection channel 58 running parallel to the plane of the back of the upper plate 20 makes it possible to arrange the recess 48 of the mount 46 on the one hand and the insertion pin 52 on the other in different locations—in the front view according to FIG. 1—in particular at different distances from the pointer shaft 30 such that the recess 48 can be arranged radially farther out than the insertion pin 52 relative to the pointer shaft 30.

The plug connection between the insertion pin 52 and the sleeve 68 must be leakproof under pressure. This pressure sealing may be obtained by a press fit between the insertion pin 52 and the bore 70 of the sleeve 68 or by gluing the insertion pin 52 to the sleeve 68. It is also possible to arrange an O-ring seal (not shown) between the insertion pin 52 and the sleeve 68.

If the plug connection between the insertion pin 52 and the sleeve 68 has not already been adequately fixed, for example, by the aforementioned press fit or by gluing, an attachment arrangement may be provided to attach the connection arrangement 6 and the spring support 16 to each other. In the exemplary embodiment depicted according to FIGS. 1 and 2, a screw 76 screwed through the support into a threaded bore 75 of the connection arrangement 6 serves as an attachment arrangement.

Provision may also be made that the insertion pin 52 and the sleeve 64 are welded together after the insertion pin 52 has been inserted into the sleeve 64. In this case, the welding provides both adequate pressure sealing of the plug connection and fixation of the spring support 16 and the connection arrangement 6 to each other.

As FIGS. 7 and 8 in particular show, a stop surface 78 surrounds the insertion pin 52. An associated stop surface 80 is formed around the bore 70 of the sleeve 68 on the connection arrangement 6 (see FIGS. 9 and 10). During plugging together of the insertion pin 52 and the sleeve 68, the stop surfaces 78 and 80 come into contact with each other such that thereby the correct relative positioning between the stop connection arrangement 6 and the spring support 16 as well as the upper plate 20 in the axial direction of the insertion pin 52 is ensured. In order to ensure the correct rotational position between the connection arrangement 6 and the spring support 16 relative to the axis of the insertion pin 52, in the exemplary embodiment according to FIGS. 1 and 2, an alignment pin 82 inserted in these elements is provided. This alignment pin is, however, not an essential characteristic and may also be replaced by equivalent means.

FIGS. 3 and 4 show in depictions analogous to FIGS. 1 and 2 a second exemplary embodiment of the pressure measurement device according to the invention. Those elements of the second exemplary embodiment which correspond to or are the same as the elements of the first exemplary embodiment are provided with the same reference characters as in the first exemplary embodiment and are not explained again.

The second exemplary embodiment differs from the first exemplary embodiment only in that its connection arrangement 6 and the opening provided in the housing 2 for the connection arrangement 6 are designed differently than in the first exemplary embodiment.

The connection arrangement 6 of the second exemplary embodiment is depicted in particular in FIGS. 11 and 12. It is designed in one piece and includes the device connector 64, the sleeve 68, and a Z-shaped connection piece 84, through which the pressure channel 66 runs. The connection piece 84 connects the device connector 64 with the sleeve 68 such that the axis of the device connector 64 and the axis of the bore 70 of the sleeve 68 run parallel to each other and at a distance from each other.

The connection arrangement 6 of the second exemplary embodiment is inserted in its housing such that the connection piece 84 extends through an opening in the back wall 8 of the housing 2 and that the fluid connector 64 protrudes from the back wall 8 toward the back. The pressure measurement device according to the second exemplary embodiment is thus a pressure measurement device with rear connection. The sleeve 68 is located in the interior of the housing 2. The measurement system of the second exemplary embodiment has the same design as the measurement system of the first exemplary embodiment and is connected with the connection arrangement 6 in the same manner as in the first exemplary embodiment.

The preceding explanations of the first and the second exemplary embodiment thus show that it is possible, based on the design of the measurement system and the pressure measurement device according to invention, to use the same measurement system both for a pressure measurement device with radial connection and for a pressure measurement device with rear connection. The spring support 16 on the one hand and the connection arrangement 6 on the other are two separately manufactured devices which are connected to each other inside the housing 2, and, in fact, by a plug connection which can be produced by a simple translational pushing together and requires no relative rotation between the connection arrangement 6 on the one hand and the spring support 16 on the other. Since the connection arrangement and the spring support are separately manufactured devices, they can be made of different materials. The spring support 16 is usually made of a high-tensile metal material so it can be soldered to the Bourdon tube. The connection arrangement 6 does not have to be made of the same metal material, but rather may be made of a less expensive synthetic and also be designed in one piece with the housing 2.

In both exemplary embodiments of the pressure measurement device described, the spring support of the prior art pressure measurement device, wherein it is typical that the connection arrangement is integrated into the spring support, is replaced by the specially designed spring support 16 described and the connection arrangement 6 connected by the plug connection with the spring support 16 inside the housing. Consequently, the characteristic feature of the pressure measurement device according to invention can also be seen in that the prior art spring support is subdivided into two sections, i.e., an outer section, which was described above as the connection arrangement 6, and an inner section, which was described above as the spring support 16.

In both above-described exemplary embodiments, the Bourdon tube is curved in the shape of an arc. The Bourdon tube many, however, also be curved in known fashion in the shape of a helix. FIG. 13 depicts, in a view analogous to FIG. 8, a second embodiment of the system support, which differs from the system support according to FIG. 5 in that the mount 46 has a different design. In this case, the recess 48 in the mount 46 is designed as a pocket bore such that this recess can accommodate the first end of a helix-shaped Bourdon tube.

In both above-described exemplary embodiments of the pressure measurement device, the insertion pin 52 is designed on the spring support 16 or on the system support and the sleeve 68 is designed on the connection arrangement 6. However, a reverse arrangement of the sleeve and the insertion pin is also possible. FIG. 14 shows, in a depiction analogous to FIG. 7, a third embodiment of the system support which differs from the first embodiment of the system support described with reference to FIGS. 5 through 8 in that the first plug-in component is designed as a sleeve 86 with a bore 88 and that, accordingly, the connection part 56 has a greater thickness than in the first embodiment. The sleeve 86 is assembled together with an insertion pin which, in the connection arrangements according to FIGS. 9 and 12, is provided instead of the sleeve 68 depicted in these figures and which has the form of the insertion pin 52 according to FIGS. 7 and 8.

In the system support according to FIGS. 5 through 8, the mount 16, the insertion pin 52, the connection part 56, and the upper plate 20 are designed in one piece with each other. These elements may, however, also first be produced separately and then connected to each other. FIGS. 15 and 16 depict an assembly unit comprising the upper plate 20 and the spring support 16 which differs from the system support according to FIGS. 5 through 8 in that the upper plate 20 was produced separately from the spring support 16, which, for its part, is a one-piece component. In the connection means for attachment of the spring support 16 and the upper plate to each other are not shown in FIGS. 15 and 16.

In the first and the second exemplary embodiment of the pressure measurement device, the measurement system is incorporated into the housing 2 and the fluid connector 64 is located outside on the housing. FIG. 17 depicts a third exemplary embodiment of the pressure measurement device wherein no external device connection is provided. As a detail of a system carrying the substance to be measured, FIG. 17 depicts a plate 90 in which a measurement substance channel 92 is formed. A wall 94, which delimits a chamber 96, is formed on the plate 90. Also, the sleeve 68, whose bore 70 is connected via a branch channel 98 with the measurement substance channel 92, is formed on the plate 90 and the wall 94.

The measurement system of the third exemplary embodiment of the pressure measurement device has the same design as the measurement systems of the first and the second exemplary embodiment of the pressure measurement device and is arranged in the chamber 96. The insertion pin 52 of the spring support 16 of the measurement system is inserted into the bore 70 of the sleeve 68 such that the measured pressure can arrive in the interior of the Bourdon tube 12 via the branch channel 98, the bore 70, the bore 54 in the insertion pin 52, and the connection channel 58 (see FIG. 7). With regard to the means for sealing the plug connection, the means for attachment of the measurement system, and the means for correct alignment thereof, the explanations given in this regard in conjunction with the first embodiment of the pressure measurement device apply.

The pressure measurement device has a housing with a back wall and a side wall, a measurement system arranged inside the housing, as well as a connection arrangement with a device connector arranged outside on the housing. The measurement system has a pointer mechanism with an upper plate and a pointer shaft as well as a curved metal Bourdon tube and a spring support supporting the Bourdon tube. The connection arrangement and the spring support are connected inside the housing by means of a plug connection which is formed by a first plug-in component formed on the spring support and a second plug-in component formed on the connection arrangement. The measurement system is distinguished in that its spring support has the plug-in component and that the plug-in component is arranged radially near the pointer shaft.

What is claimed is:

1. A pressure measurement assembly for use in a pressure measurement device, said system comprising:

a) a Bourdon tube and pointer shaft support having a flow passageway therein for communicating pressure to be measured from an inlet to said passageway into a hollow curved Bourdon tube, said support including a plate having an aperture for a pointer shaft to which a pointer may be connected on a first side of said plate;

b) a hollow curved Bourdon tube affixed to said support in fluid communication with said passageway;

c) a rotatably mounted pointer shaft extending through said aperture in said plate and having an end for affixation of a pointer on said first side of said plate; and c) a mechanical connection between said Bourdon tube and said pointer shaft for rotating said pointer shaft under the influence of internal pressure in said Bourdon tube, said support including a plug-in component having a fluid inlet to said passageway, said plug-in component being integrally formed on said support and extending from a second side of said plate substantially parallel to said pointer shaft.

2. The measurement assembly of claim 1, further comprising a dial affixed to said plate on said first side of said plate, said plug-in component being radially spaced from said shaft no more than the distance between an edge of said dial nearest said plug-in component and said shaft.

3. The measurement assembly of claim 1, wherein a portion of said passageway extends substantially parallel to said plate on said second side of said plate.

4. The measurement assembly of claim 1, wherein said plug-in component is a sleeve which includes said inlet.

5. The measurement assembly of claim 4, further comprising a stop surface surrounding said inlet in said sleeve.

6. The measurement assembly of claim 1, wherein said plug-in component is an insertion pin which includes said inlet.

7. The measurement assembly of claim 6, further comprising a stop surface surrounding said insertion pin.

8. The measurement assembly of claim 1, wherein said plate is a separately produced part which is attached to said plug-in component.

9. The measurement assembly of claim 1, wherein said plate and said plug-in component are an integrally formed part.

10. A pressure measurement device comprising:
a) a housing having a back wall and a side wall;
c) the pressure measurement assembly of claim 1 disposed in said housing; and
b) a fluid connector extending through at least one of said housing walls for introducing fluid pressure into said housing, said connector including a second plug-in component inside said housing connected in fluid tight relation to said first plug-in component.

11. The pressure measurement device of claim 10, wherein said fluid connector includes a stop surface surrounding said second plug-in component.

12. The pressure measurement device of claim 11, wherein said stop surface is arranged in a plane perpendicular to said pointer shaft.

13. The pressure measurement device of claim 12, wherein said first and second plug-in components are connected in fluid tight relation by a press fit.

14. The pressure measurement device of claim 12, wherein said first and second plug-in components are connected in fluid tight relation by gluing.

15. The pressure measurement device of claim 12, wherein said first and second plug-in components are connected in fluid tight relation by welding.

16. The pressure measurement device of claim 10, wherein said housing and said fluid connector comprise a single part.

17. The pressure measurement device of claim 10, wherein said fluid connector is a threaded pin.

18. The pressure measurement device of claim 17, wherein said threaded pin is on said back wall of said housing.

19. The pressure measurement device of claim 17, wherein said threaded pin is on said side wall of said housing.

* * * * *